US008209631B2

(12) United States Patent
Kraft et al.

(10) Patent No.: US 8,209,631 B2
(45) Date of Patent: Jun. 26, 2012

(54) USER INTERFACE FOR AN ELECTRONIC DEVICE

(75) Inventors: Christian Kraft, Frederiksberg C (DK); Peter Dam Nielsen, Lyngby (DK)

(73) Assignee: Nokia Corporation, Espoo (FI)

( * ) Notice: Subject to any disclaimer, the term of this patent is extended or adjusted under 35 U.S.C. 154(b) by 103 days.

(21) Appl. No.: 11/467,006

(22) Filed: Aug. 24, 2006

(65) Prior Publication Data
US 2008/0052640 A1 Feb. 28, 2008

(51) Int. Cl.
*H04M 1/00* (2006.01)
(52) U.S. Cl. .................... 715/811; 715/825; 715/830
(58) Field of Classification Search .............. 715/810, 715/811, 864, 830
See application file for complete search history.

(56) References Cited

U.S. PATENT DOCUMENTS

| | | | |
|---|---|---|---|
| 6,636,803 B1* | 10/2003 | Hartz, Jr. et al. ............ | 701/459 |
| 6,801,190 B1* | 10/2004 | Robinson et al. ............. | 345/173 |
| 6,847,387 B2* | 1/2005 | Roth ............................ | 715/811 |
| 7,376,913 B1* | 5/2008 | Fleck et al. .................... | 715/864 |
| 7,418,670 B2* | 8/2008 | Goldsmith .................... | 715/810 |
| 7,526,718 B2* | 4/2009 | Samadani et al. ............ | 715/201 |
| 2001/0019338 A1* | 9/2001 | Roth ............................ | 345/811 |
| 2002/0077158 A1* | 6/2002 | Scott ............................ | 455/567 |
| 2003/0008686 A1* | 1/2003 | Park et al. .................... | 455/566 |
| 2004/0169673 A1* | 9/2004 | Crampe et al. ............... | 345/700 |
| 2005/0081164 A1* | 4/2005 | Hama et al. .................. | 715/830 |
| 2005/0119031 A1 | 6/2005 | Spalink et al. | |
| 2005/0204294 A1* | 9/2005 | Burke .......................... | 715/739 |
| 2005/0246665 A1* | 11/2005 | Luke et al. ................... | 715/864 |
| 2006/0218503 A1* | 9/2006 | Matthews et al. ............ | 715/779 |
| 2006/0282790 A1* | 12/2006 | Matthews et al. ............ | 715/767 |
| 2007/0083827 A1* | 4/2007 | Scott et al. .................... | 715/811 |
| 2007/0157119 A1* | 7/2007 | Bishop ......................... | 715/810 |
| 2007/0192711 A1* | 8/2007 | Lee et al. ...................... | 715/764 |

FOREIGN PATENT DOCUMENTS

EP 1 376 325 A 1/2004
GB 2 408 185 A 5/2005

OTHER PUBLICATIONS

Chinese Office Action dated May 25, 2011.
International Search Report and Written Opinion for Application No. PCT/EP2007/007322 dated Dec. 17, 2007.
Nokia N70 Review: Universal Fighter—GSMArena.com [online] [retrieved Jan. 30, 2012]. Retrieved from the Internet: <URL: http://www.gsmarena.com/nokia_n70-review-53p3.php>. 3 pages.
Office Action for Chinese Application No. 200780031243.X dated Mar. 19, 2012.
Office Action for European Application No. 07 801 762.1 dated Apr. 10, 2012.

* cited by examiner

*Primary Examiner* — Boris Pesin
*Assistant Examiner* — Daeho Song
(74) *Attorney, Agent, or Firm* — Alston & Bird LLP

(57) ABSTRACT

Electronic device with the user interface in which selectable items are shown on the display and can be selected by a user via an input component. A processor unit in the device organizes the selectable items in groups with a predetermined static sequence. The processor unit also maintains dynamic subgroups of preferred items. When the items in a group are being displayed in an available display area, the processor unit shows the subgroup of preferred items before the group of standard items. The first item in the group of standard items is highlighted and the user can either scroll towards the items in the subgroup of preferred items or to the standard items in the group.

15 Claims, 3 Drawing Sheets

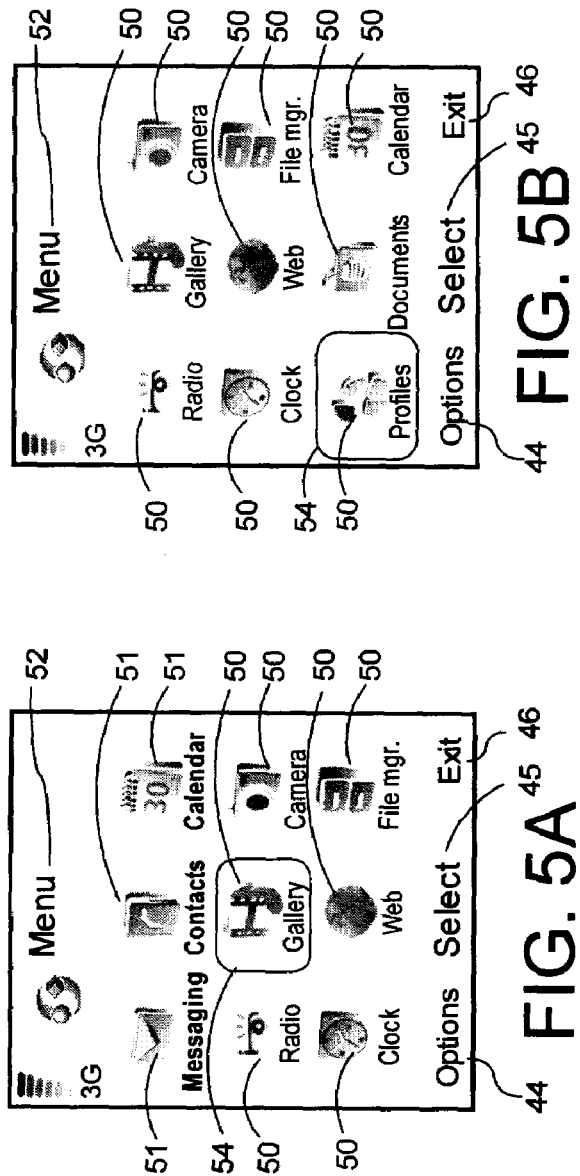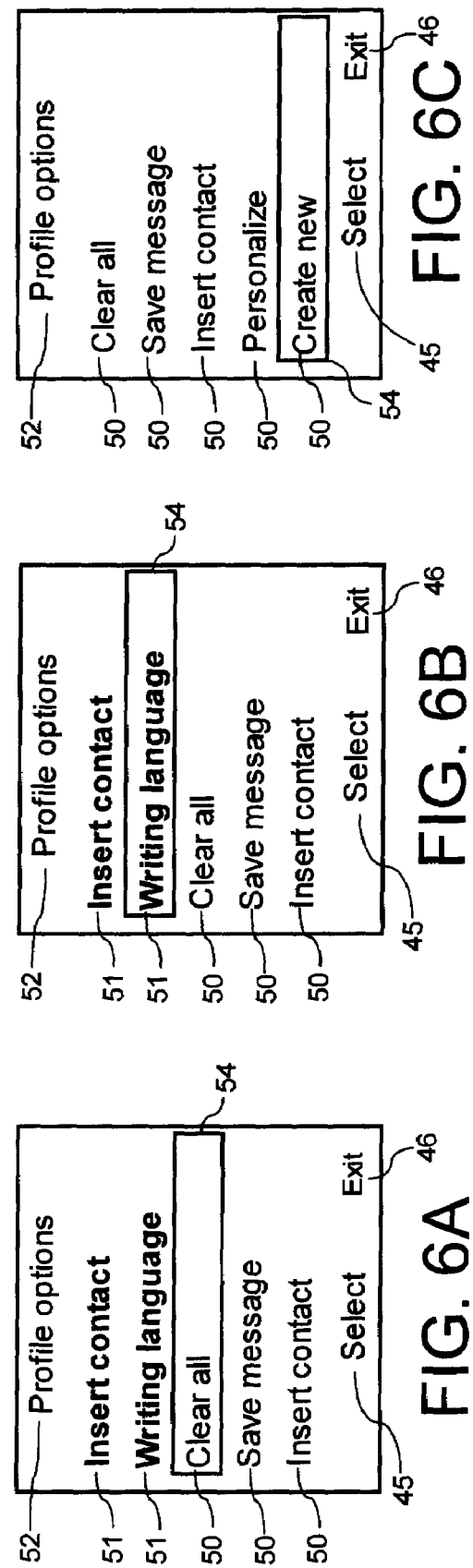

USER INTERFACE FOR AN ELECTRONIC DEVICE

FIELD

The disclosed embodiments relate to electronic devices that have a user interface in which selectable items are shown on a display and can be selected by a user via an input component.

BACKGROUND

The user interface of electronic devices often includes showing a list or two-dimensional array of items that belong to a group of items within a given display area. The display area can be the complete display of the device or a window on the display of the device. The groups of items can for example be files within a folder, menu items within a menu structure or similarly organized groups of items. The user interfaces are constructed such that a user can navigate to a particular item of interest and thereafter open or activate the item of interest. The item of interest could for example be a program that is started, a function that is activated or a file that is opened.

Since display area is limited, particularly in mobile devices, it is often not possible to display all of the items of a group inside the available display area. Therefore, the list or two-dimensional array is often presented in a scrollable form, with the items at the end(s) of the one- or two-dimensional array initially not being visible. Thus, the user will need to scroll in order to reach the initially not shown items. Further, in mobile devices that operate without the use of input from a mouse or the like, one predetermined item in the array is initially highlighted and the user needs to repeatedly press a navigation key or the like to scroll through the items in the array to reach a desired item. The ever-increasing complexity of mobile devices has caused the number of items within a group to increase significantly over the past years. This means that the users have on average to do a lot more scrolling in order to reach a desired item.

Therefore, there is a desire to reduce the amount of scrolling that is required to select items from groups of items that are shown on the displays of electronic devices.

SUMMARY

In one embodiment an electronic device is provided with a user interface in which selectable items are shown on a display and can be selected by a user via an input component, the device comprising a processor unit being configured to control operation of the electronic device, a display coupled to the processor unit, an input component coupled to the processor unit, the input component having a selection element for selecting an item and a scroll element for activating a scroll function, the processor unit being configured to arrange the items in groups with the items within a group organized in a predetermined static sequence, the processor unit being configured to maintain dynamic subgroups of preferred items chosen from the items in the group to which the subgroup belongs, the processor unit being configured to show the items in a group as a standard array in an available display area in accordance with the predetermined sequence, the processor unit being configured to show the standard array inside the available display area as a scrollable array with some of the items at the end of the sequence initially not being shown when the available display area is insufficient to show all of the items in a group simultaneously within the available display area, and the processor unit being configured to show at least initially also the items in the subgroup of preferred items inside the same available display area.

The most used items are user specific characteristic, and therefore it is practically impossible to create manufacturer determined sequences with the most used items placed at the beginning of the sequence matching the behavior of each and every user. In order to solve this problem, it has been suggested to continuously adapt the sequence of the items in a group to the frequency of use of the items. However, a completely dynamic sequence in the groups is not considered advantageous since the user will not be able to memorize where certain items can be found, thereby hindering so-called "blind usage" of the arrays, in which users know exactly how many positions they need to scroll before reaching a desired item.

By placing a few of the most used items just before the start of the array, a user can navigate with relatively few activations of a navigation key to the most used items. Thus, the advantages of a dynamic list with most used items and a static list that can be blindly used are in the present invention combined without a trade-off to the negative aspects associated with each of these concepts on their own.

Preferably, the processor unit is configured to initially display the subgroup of preferred items as a preferred array that is positioned before the standard array containing all the items of the group concerned.

The processor unit may be configured to initially highlight or mark the first item in the sequence.

The processor unit can be configured not to display the preferred array any longer when a user scrolls from the first item in the sequence to the next item in the sequence.

Preferably, the processor unit is configured to allow the user to scroll from the initially highlighted or marked first item in the sequence to the item of the preferred array that is positioned just before the first item in the sequence.

The processor unit may be configured to allow the user to scroll between the items in the preferred array.

The processor unit can be configured to activate or open a highlighted item when a user uses the selection element of the input component.

Preferably, the processor unit is configured to choose the items from a group as preferred items on a frequency of use related criterion.

The processor unit can be configured to choose the most used items during given preceding period of time as preferred items in a subgroup.

Preferably, the processor unit is configured to select the next most used items during a given preceding period of time when one or more item at the beginning of the predetermined sequence are the most used items during a proceeding period of time.

The processor unit can be configured to show the items in the group and in the subgroup as a list.

The processor unit may be configured to initially position the items in the subgroup at the top of the list, followed by the items in the group in accordance with the predetermined sequence.

The processor unit can be configured to initially highlight or mark the first item of the sequence.

Preferably, the processor unit is configured to stop showing the subgroup when the user scrolls downwards from the initially highlighted or marked first item.

The processor unit can be configured to highlight or mark the preferred item just above the first item when the user scrolls upwards from the initially highlighted or marked first item.

In one aspect, a method is provided for arranging a plurality of selectable items on a display of an electronic device that at least partially fulfills the desire indicated above.

In one embodiment a method is provided for showing selectable items on the display of on electronic device that is provided with an input component including a selection element and a scroll element, the method comprising arranging the selectable items in groups, with the items within a group organized in a predetermined static sequence, maintaining dynamic subgroups of preferred items chosen from the items in the group to which the subgroup belongs, showing items in a group as a standard array in available display area in accordance with the predetermined sequence, showing the standard array inside the available display area as a scrollable array with some of the items at the end of the sequence initially not being shown when the available display area is insufficient to show all of the items in a group simultaneously within the available display area, and showing at least initially also the items in the subgroup of preferred items inside the same available display area.

In a further aspect a software product is provided that at least partially fulfills the desire indicated above.

In one embodiment a software product is provided for use in an electronic device in which selectable items are shown on a display, the software product comprising software code for arranging the a selectable items in groups, with the items within a group organized in a predetermined static sequence, software code for maintaining dynamic subgroups of preferred items chosen from the items in the group to which the subgroup belongs, software code for showing items in a group as a standard array in available display area in accordance with the predetermined sequence, software code for showing the standard array inside the available display area as a scrollable array with some of the items at the end of the sequence initially not being shown when the available display area is insufficient to show all of the items in a group simultaneously within the available display area, and software code for showing at least initially also the items in the subgroup of preferred items inside the same available display area.

Further objects, features, advantages and properties of the electronic device, method and software product according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIGS. 5A and 5B are screenshots illustrating the operation of the user interface of the terminal shown in FIG. 1, and FIGS. 6A to 6C are screenshots illustrating another aspect of the operation of the user interface of the terminal shown in FIG. 1.

DETAILED DESCRIPTION OF PREFERRED EMBODIMENTS

In the following detailed description, the mobile electronic device, the method and the software key according to the invention in the form of a cellular/mobile phone will be described by the preferred embodiments.

Figure 3:
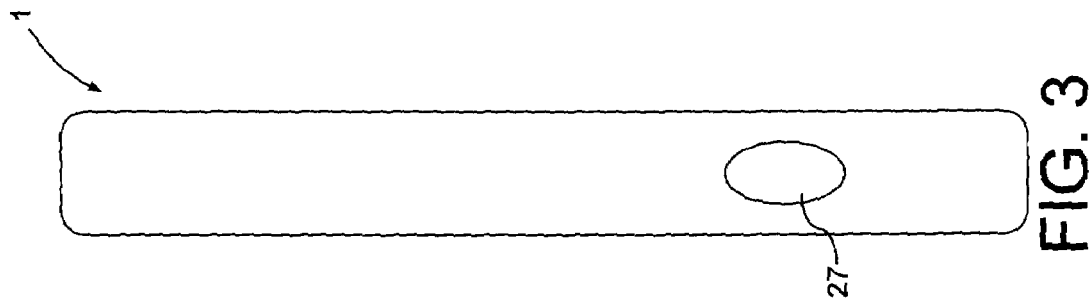
FIG. 3 is a side view of the device shown in FIG. 1.
Figure 2:
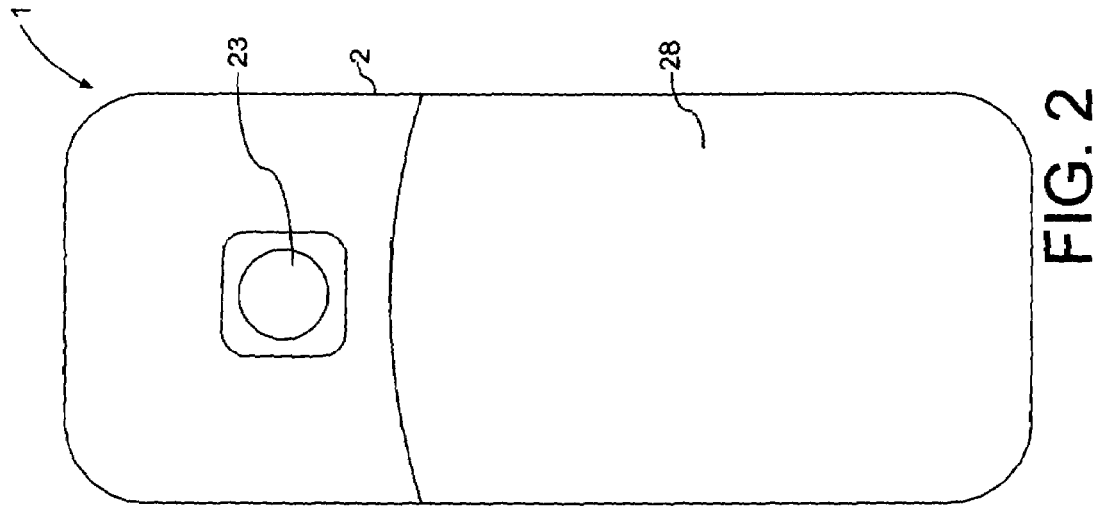
FIG. 2 is a rear view of the device shown in FIG. 1.
Figure 1:
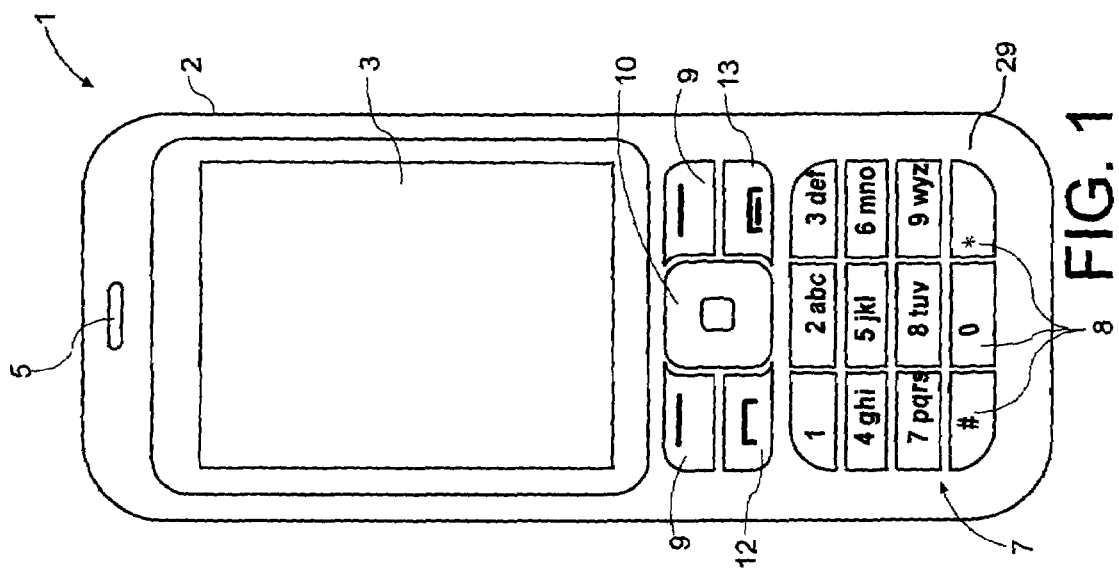
FIG. 1 is a front view of a mobile electronic device according to a first embodiment of the invention.

FIGS. 1 to 3 illustrate an embodiment of a mobile terminal according to the invention in the form of a mobile telephone 1 by a front view, a rear view and a side respectively. The mobile phone 1 comprises a user interface having a housing 2, a display 3, an on/off button (not shown), a speaker 5 (only the opening is shown), and a microphone 6 (only the opening in the housing 2 leading to the microphone is shown). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 has a first group of keys 8 with alphanumeric keys. The keypad 7 has additionally a second group of keys comprising two softkeys 9, two call handling keys (offhook key 12 and onhook key 13), a five way navigation key 10 for scrolling and selecting. The function of the softkeys 9 depends on the state of the mobile phone 1, and navigation in the menu is performed by using the navigation key 10. The present function of the softkeys 9 is shown in separate fields (soft labels) in a dedicated area of the display 3, just above the softkeys 9. The two call handling keys 12, 13 are used for establishing a call or a conference call, terminating a call or rejecting an incoming call.

A releasable rear cover 28 gives access to the SIM card 22 (FIG. 4), and the battery pack 24 (FIG. 4) in the back of the mobile phone 1 that supplies electrical power for the electronic components of the mobile phone 1.

The mobile phone 1 has a flat display 3 that is typically made of an LCD with optional back lighting, such as a TFT matrix capable of displaying color images.

A digital camera 23 (only the lens is visible in FIG. 2) is placed in the rear side of the mobile phone 1. A shutter key 27 for the digital camera is provided on one of the narrow sides of the housing 2.

Figure 4:
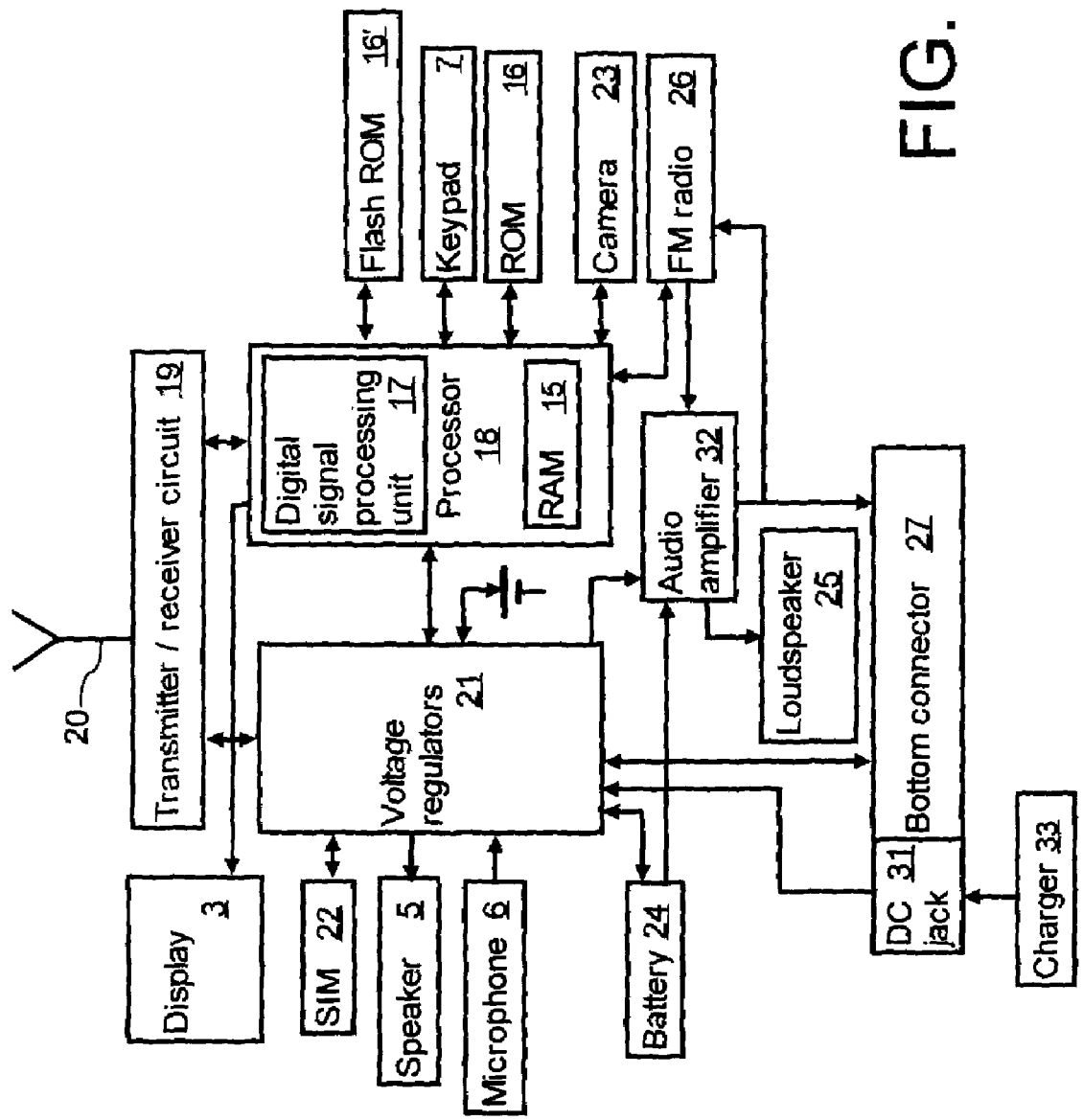
FIG. 4 is a block diagram illustrating the general architecture of a mobile phone in accordance with the present invention.

FIG. 4 illustrates in block diagram form the general architecture of a mobile phone 1 constructed in accordance with the present invention. The processor 18 controls the operation of the terminal and has an integrated digital signal processor 17 and an integrated RAM 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the DSP 17 that is included in the processor 18. The encoded speech signal is transferred to the processor 18, which e.g. supports the GSM terminal software. The digital signal-processing unit 17 speech-decodes the signal, which is transferred from the processor 18 to the speaker 5 via a D/A converter (not shown).

The voltage regulators 21 form the interface for the speaker 5, the microphone 6, the LED drivers 19 (for the LEDS backlighting the keypad 7 and the display 3), the SIM card 20, battery 24, the bottom connector 27, the DC jack 31 (for connecting to the charger 33) and the audio amplifier 33 that drives the (hands-free) loudspeaker 25.

The processor 18 also forms the interface for some of the peripheral units of the device, including a ROM memory 16, a Flash ROM memory 16', the graphical display 3, the keypad 7, the navigation key 10, the digital camera 23 and an FM radio 26 and the shutter key 27.

The software in the ROM 16 contains instructions for the processor 18 to perform various functions and to run various applications that will be described with reference to screenshots herebelow. The processor 10, which serves as the controller unit in a manner known per se. Amongst the basic functions of the software in the mobile phone 1 is the menu structure. The menu structure is entered from an idle mode (not shown) via the softkeys 9.

The software in the ROM memory 16 contains instructions for the processor to arrange items in groups. The items can be of various nature, such as for example menu items or files. A group can be a menu level that contains a plurality of menu items or folder that contains a plurality of files. A static sequence is associated with the items in a group. The sequence defines the order of the items in a group from start to end.

In this context, the term "static" means that the sequence is not continually updated and revised by the processor 18. On the other hand the term "static" does not exclude the revision of the sequence by the user, for example, the sequence of menu items will typically be predetermined by the manufacturer, but the software can also be provided with routines that allow the user to change the sequence. Another example is the sequence of a plurality of files in a folder, which will typically be chronological, based on the last time the files were amended or alphabetical, based on the name of the files. During use, the chronological order will automatically change and if the user renames a file this will also change the alphabetical order. These sequences are never-the-less considered to be static sequences.

The software also contains instructions for the processor 18 to maintain subgroups of preferred items that are chosen from the group to which the items belong. The subgroup of preferred items typically contains much fewer items than the group to which it belongs.

The criteria for choosing the preferred items may vary, and a typical example is a selection criteria based on the most frequent use during a preceding period of time. Thus, the processor 18 has instructions to choose a predetermined number of most frequently used items as the preferred items in a subgroup.

FIGS. 5A and 5B show a screenshot of the upper level menu just after it has been entered. A left softkey label 44, a middle softkey label 45 and a right to softkey label 46 are shown close to the bottom of the display 3 in proximity of the softkeys 9 and the navigation plus select key 10.

At the top of the display a title 52 "Menu" indicates the menu level to the user (in this case the top menu level). A plurality of menu items in the form of selectable graphical icons 50 and 51 are shown on the display 3 in the form of an array. The items 51 belong to the subgroup of preferred items, and therefore they are shown at the top of the array, easily accessible and visible to the user. The bold print below the graphical icons of the preferred items 51 indicates to the user that the items 51 are "preferred". It is however understood that the preferred items could be marked in other ways, such as by a different color of print or other graphical measure to highlight a particular group of items.

Below the preferred group, the "standard" menu items 50 are listed in array form in accordance with a predetermined (manufacturer or user determined) sequence.

The centrally placed menu item 50 "Gallery" is marked by a box 54 drawn around the graphical item. The software contains instructions to initially mark or highlight a menu item at or near the start of the sequence, at position where it is easy to navigate from the group of "standard" items to the "preferred" items. In the array form of the present menu, the central position just below the preferred items 51 is ideal since minimizes the amount of navigation to reach the visible menu items 50 and 51.

By means of the navigation key 10 the user may selectively jump to neighboring menu items 50. Thus, the user can navigate upwards towards the preferred items by relatively few key presses on the navigation key 10 and thereby highlight a desired item 51. By means of the left softkey 44 and the select function of the navigation key the user can either access options related to the highlighted menu item 51 or "Select" the highlighted menu item 51. In this context the term "Select" means that the application, folder or function associated with the items is opened or activated. With the right softkey 46 "Exit" the user can leave the menu to return to the idle state of the mobile phone 1.

Not all of the menu items 50 of the main menu can be shown on the available area of display 3 simultaneously. Therefore, the items 50 that are placed towards the end of the sequence are initially not shown. When the user navigates downwards more than one step the array will scroll, which is shown in FIG. 5B. Thereby the items 50 further down the sequence of the group concerned are shown. At this moment the preferred items 51 are no longer visible and the subgroup of preferred items does not reappear at the top of the display 3 when the user scrolls upwards again. However, the preferred items will be shown at their "normal" position in the sequence so that they still can be accessed by the user.

In FIG. 5B the menu item 50 "Profiles" has been highlighted, and by centrally pressing the navigation key "Select" the processor changes the contents on display to the screenshot shown in FIG. 6A.

The menu level indicator 52 has changed to "Profile options" and in this submenu the menu items are displayed as an endless scrollable list (a one dimensional array) also called a menu loop.

Initially, the two most used menu items are listed as preferred menu items 51 at the top of the list. Bold print indicates to the user that the menu items 51 one are "preferred" items. The list with the standard items 50 is displayed in accordance with a predetermined sequence, starting just below the preferred menu items 51. Initially, it is the first of the standard items 50 "Clear all" that is automatically highlighted.

The user may selectively jump to the preceding or succeeding item 50, 51 by using the navigation key 10.

In FIG. 6B the user scrolled one step upwards the preferred menu item 51 "Writing language" is now highlighted by box 54. The highlighted menu item 51 can be activated by centrally pressing the navigation key 10 "Select".

FIG. 6C shows a screenshot illustrating the content of the display that is arrived at when the user has scrolled four steps downwards from the state shown in FIG. 6A. Some of the menu items 50 towards the end of the sequence that could initially not be shown in the available display area have now become visible, one of them "Create new" being highlighted by box 54.

The software instructs the processor 18 to choose the next most frequently used menu items when one or more of the most used items in a preceding period of time are identical with the menu items at the start of the sequence. Thus, when the first and second most frequently used items are already at the beginning of the sequence of standard items, the processor will select the third and fourth most frequently used items for the preferred subgroup.

The term "comprising" as used in the claims does not exclude other elements or steps. The term "a" or "an" as used in the claims does not exclude a plurality. The single processor or other unit may fulfill the functions of several means recited in the claims.

Although the embodiments have been described in detail for purpose of illustration, it is understood that such detail is solely for that purpose, and variations can be made therein by those skilled in the art without departing from the scope of the invention.

The invention claimed is:

1. An apparatus comprising:
   a processor;
   a memory including computer program code; the memory and the computer program code configured to, with the processor, cause the apparatus at least to:
   provide selectable items in a group with the selectable items organized in a predetermined static sequence;
   show preferred items chosen from the selectable items together as a dynamic subgroup;
   show the dynamic subgroup and at least some of the other selectable items concurrently with the dynamic subgroup being segregated from the other selectable items, wherein at least the selectable items are shown in a standard array with some of the selectable items initially not being shown when an available display area is insufficient; and
   provide scrolling of the dynamic subgroup and the other selectable items; and
   cause the display of the dynamic subgroup relative to the other selectable items to be changed following scrolling, wherein the display of the dynamic subgroup relative to the other selectable items to be changed comprises causing the preferred items of the dynamic subgroup to be interspersed with the other selectable items such that the dynamic subgroup is no longer segregated from the other selectable items and does not reappear above the other selectable items when a user scrolls again.

2. The apparatus of claim 1 wherein the memory and the computer program code are configured to, with the processor, cause the apparatus to initially highlight or mark the first item in said sequence.

3. The apparatus of claim 2 wherein the memory and the computer program code are configured to, with the processor, cause the apparatus to allow a selection to be changed from the initially highlighted or marked first selectable item in said sequence to the item of the preferred array that is positioned just before the first item in said sequence.

4. The apparatus of claim 2 wherein the memory and the computer program code are configured to, with the processor, cause the apparatus to activate or open a highlighted selectable item upon selection of the highlighted selectable item.

5. The apparatus of claim 1 wherein the memory and the computer program code are configured to, with the processor, cause the apparatus to choose the preferred items from the selectable items on a frequency of use related criterion.

6. The apparatus of claim 5, wherein the memory and the computer program code are configured to, with the processor, cause the apparatus to choose the most used selectable items during a given preceding period of time as preferred items in a subgroup.

7. The apparatus of claim 6, wherein the memory and the computer program code are configured to, with the processor, cause the apparatus to select the next most used selectable items during a given preceding period of time when one or more item at the beginning of the predetermined sequence are the most used selectable items during a proceeding period of time.

8. The apparatus of claim 1 wherein the memory and the computer program code are configured to, with the processor, cause the apparatus to show the selectable items in the group and in the subgroup as a list or other one-dimensional array.

9. The apparatus of claim 8, wherein the memory and the computer program code are configured to, with the processor, cause the apparatus to initially highlight or mark the first selectable item of said sequence.

10. The apparatus of claim 9, wherein the memory and the computer program code are configured to, with the processor, cause the apparatus to stop showing said subgroup when a selection changes from said the initially highlighted or marked first selectable item.

11. The apparatus of claim 10, wherein the memory and the computer program code are configured to, with the processor, cause the apparatus to highlight or mark the preferred selectable item just above said first selectable item when a selection changes upwards from said initially highlighted or marked first selectable item.

12. A method comprising:
    using a device to show selectable items in a group with the selectable items organized in a predetermined static sequence;
    using a device to show preferred items chosen from the selectable items together as a dynamic subgroup;
    for showing the dynamic subgroup and at least some of the other selectable items concurrently with the dynamic subgroup being segregated from the other selectable items, wherein at least the selectable items are shown in a standard array with some of the selectable items initially not being shown when an available display area is insufficient; and
    for causing the display of the dynamic subgroup relative to the other selectable items to be changed following scrolling, wherein the display of the dynamic subgroup relative to the other selectable items to be changed comprises causing the preferred items of the dynamic subgroup to be interspersed with the other selectable items such that the dynamic subgroup is no longer segregated from the other selectable items and does not reappear above the other selectable items when a user scrolls again.

13. A software program product configured to execute the method according to claim 12 when run on a processor.

14. A software product stored on a non-transitory computer readable medium for use in an electronic device in which selectable items are shown on a display, said software product comprising:
    software code stored in a memory, the software code, when executed, being configured to:
    show selectable items in a group with the selectable items organized in a predetermined static sequence;
    show preferred items chosen from the selectable items together as a dynamic subgroup;
    show the dynamic subgroup and at least some of the other selectable items concurrently with the dynamic subgroup being segregated from the other selectable items, wherein at least the selectable items are shown in a standard array with some of the selectable items initially not being shown when an available display area is insufficient; and
    cause the display of the dynamic subgroup relative to the other selectable items to be changed following scrolling, wherein the display of the dynamic subgroup relative to the other selectable items to be changed comprises causing the preferred items of the dynamic subgroup to be interspersed with the other selectable items such that the dynamic subgroup is no longer segregated from the other selectable items and does not reappear above the other selectable items when a user scrolls again.

15. The method of claim 12, further comprising choosing the preferred items from the selectable items on a frequency of use related criterion.

* * * * *